United States Patent [19]

Ezawa et al.

[11] Patent Number: 4,975,313

[45] Date of Patent: Dec. 4, 1990

[54] HEAT-SHRINKABLE POLYOLEFIN COMPOSITE SHEET

[75] Inventors: Hiroshi Ezawa; Takayuki Watanabe, both of Yokohama; Hiroaki Tsushima, Kamakura; Zyuzo Nishiba, Washimiya, all of Japan

[73] Assignee: Mitsui Toatsu Chemicals, Inc., Tokyo, Japan

[21] Appl. No.: 516,135

[22] Filed: Apr. 27, 1990

[30] Foreign Application Priority Data

May 11, 1989 [JP] Japan .................................. 1-116046

[51] Int. Cl.$^5$ .............................................. B32B 3/26
[52] U.S. Cl. ................................... 428/213; 428/215; 428/317.1; 428/317.7; 428/913
[58] Field of Search ............... 428/213, 215, 314.4, 428/314.8, 317.1, 317.7, 319.7, 913

[56] References Cited

U.S. PATENT DOCUMENTS

4,049,147  9/1977  Stiles et al. ...................... 428/314.8
4,228,600  10/1980  Krug et al. ........................ 428/314.8

FOREIGN PATENT DOCUMENTS

2261299  6/1974  Fed. Rep. of Germany ... 428/317.7
26245  2/1984  Japan ................................. 428/319.7
1415852  11/1975  Liechtenstein ................... 428/314.4

*Primary Examiner*—William J. Van Balen
*Attorney, Agent, or Firm*—Burns, Doane, Swecker & Mathis

[57] ABSTRACT

A heat-shrinkable polyolefin composite sheet obtained by laminating a heat-shrinkable foamed polyolefin sheet and a polyolefin-base film with a polyurethane-base adhesive is disclosed.

4 Claims, No Drawings

HEAT-SHRINKABLE POLYOLEFIN COMPOSITE SHEET

BACKGROUND OF THE INVENTION

1. Field of the Invention

The present invention relates to a heat-shrinkable polyolefin composite sheet and particularly relates to a sheet for use in labels.

2. Prior Art of the Invention

Foamed sheets which have the property of being heat-shrinkable are widely used as pre-labels for winding on vessels such as glass bottles prior to filling the vessels. ParticularlY foamed polystyrene sheets are excellent in shock absorbing, thermal insulation and beautiful appearance, and additionally outstanding in wrapping for heat-winding on the vessels. Hence foamed polystyrene sheets are used in a large amount.

However, foamed polystyrene sheets exhibit low resistance to heat. They are unsuitable for labels of, for example, foods and drinks such as coffee and oolong tea which require increased temperature sterilization treatment including a retort sterilization step.

On the other hand, polyolefin base non-foamed sheets and films have been widely known to be suitable for retort sterilization and have been investigated for label materials having shrinkability. However, the sheets have problems in that the sheets do not constantly give cylindrical sleeves in the molding of prelabels, or the sleeves obtained do not uniformly shrink when heated and lead to deformation of the pattern printed thereon.

Further, heat-shrinking temperatures of polyolefin-base sheets and films are close to their melting temperatures. Shrunk sheets and films have poor slippage on the vessels and it is very difficult to obtain uniform patterns as in the case of heating the labels composed of heat-shrinkable polystyrene sheets.

There is also a problem that, even though labels are firmly adhered to the vessels, the labels consisting of non-foamed polyolefin-base sheets or films become loose when the temperature of the vessels returns to the room temperature and thus firm adhesion of the labels is impaired.

On the other hand, heat-shrinkable foamed polyolefin-base sheets have also been investigated. Foamed polyolefin sheets have good shrinkability. However, the sheets are opaque, and hence printing must be made on the outside surface. Outside printed sheets cause problems such as transfer of the printing ink and loss of the printed pattern due to rubbing. The sheets also have a disadvantage that the heat-sealing strength is insufficient and the sealing ability is unstable in the formation of sleeves. In the steps for heating and shrinking the sleeves so that they adhere to the vessels, countermeasures such as the use of hot-melt adhesives has also been examined in order to stabilize sealing. However, restrictions are imposed upon the use of the resulting vessels.

As mentioned above, vessels which require increased temperature treatment such as retort sterilization tend to exhibit ready separation of the sealed portions. The cells on the outside surface of the foamed sheets are also impaired in the increased temperature treatment step and broken cells contain moisture. On account of these problems, suitable prelabel sheets which can satisfy conditions in the increased temperature treatment such as retort sterilization have not yet been developed.

SUMMARY OF THE INVENTION

The object of the present invention is to provide a prelabel capable of application to a vessel for foods and drinks which require increased temperature treatment such as retort sterilization.

That is, an object of the invention is to provide a heat-shrinkable composite sheet having excellent wrapping characteristics which can firmly adhere to the vessel without generation of creases in the steps of forming sleeves by sealing both ends of a regular sized sheet and then heat-shrinking the resultant sleeve.

Another object of the invention is to provide a heat-shrinkable composite sheet which does not generate defects such as less of ink due to abrasion breakage of the surface, and separation of the seal even in the step of increased temperature treatment, in other words, which does not impair the label appearance and does not injure the label on a production line because of blocking or shortage in slippage and hence has an excellent suitability for the production line such as retort sterilization.

As a result of carrying out an intensive investigation, the present inventors have found that a heat-shrinkable polyolefin composite sheet obtained by the combination of a foamed polyolefin sheet with a polyolefin-base film under specific conditions is very effective for solving the above problems. Thus the present invention has been completed.

One aspect of the present invention is a heat-shrinkable polyolefin composite sheet obtained by laminating a heat-shrinkable foamed polyolefin sheet and a polyolefin-base film, comprising laminating:

(a) a heat-shrinkable foamed polyolefin sheet having a thickness of from 0.05 to 0.30 mm, a density of from 0.1 to 0.8 g/cm$^3$, a shrinkage of 20% or more in one direction when heated at 150° C., and a shrinkage of less than 5% in the rectangular direction, and:

(b) a polyolefin-base film having a thickness of from 0.01 to 0.05 mm, and a shrinkage of less than 10% when heated at 120° C., by using a polyurethane-base adhesive.

The heat-shrinkable polyolefin composite sheet of the invention causes neither wrinkle due to shrinkage nor looseness after shrinkage when the sheet is heat-shrunk in the form of a sleeve. Hence the composite sheet is suitable for the preparation of the prelabel. According to the composite sheet, printed ink can be protected from direct rubbing even in the step of increased temperature treatment such as retort sterilization. Consequently, problems of loss of ink due to the abrasion and transfer of ink can be eliminated and additionally the cells in the foamed sheet can be protected and the commodity value of foods and drinks can be enhanced.

Further, on account of laminating the foamed polyolefin sheet and the polyolefin film, the composite sheet of the invention can foam the sleeve under wide and stable conditions and increase its stiffness depending upon the thickness of the foamed polyolefin sheet. Thus, the composite sheet provides favorable effects on the production, for example, decrease in the loss due to bending back of the edge of the sleeve in the step of fitting the sleeve on the vessel.

DETAILED DESCRIPTION OF THE INVENTION

The heat-shrinkable foamed polyolefin sheet used in the invention can be prepared from a mixture of polypropylene as a principal raw material with polyethylene and/or polybutene.

Polypropylene includes polypropylene homopolymer, copolymers of propylene as a major monomer with α-olefins such as ethylene and 1-butene, and modified resins thereof.

Polyethylene includes low density polyethylene, medium and high density polyethylene and straight chain low density polyethylene. Particularly preferred polyethylene is low density polyethylene and straight chain low density polyethylene.

For example, in case of the mixing ratio of polyethylene to polypropylene is in the range of 5 to 80 parts by weight, preferably 20 to 60 parts by weight of polyethylene per 100 parts by weight of polypropylene. When the ratio is outside of the above range, cells of the foamed sheet become irregular and cause uneven adhesion in laminating with the polyolefin-base film. Thus, delamination and other problems can result from an increased temperature treatment step such as retort sterilization.

Exemplary foaming agents include organic chemical foaming agents such as azodicarboxylic acid amide and nitrosopentamethylenetetramine, and inorganic chemical foaming agents such as a combination of sodium hydrogen carbonate and citric acid. A preferred foaming agent is an organic chemical foaming agent having a decomposition temperature higher than the melting point of polypropylene. The amount of the foaming agent added is in the range of 0.2 to 20 parts by weight per 100 parts by weight of the resin. Coloring agents, fillers, antistatic agents and other additives may be added to the resin when necessary. The foamed sheet can be prepared by using a conventional extruder. The thickness, density and the shrinking performance of the resultant sheet are important in the present invention. The thickness of the foamed polyolefin sheet is in the range of 0.05 to 0.3 mm. A thickness less than 0.05 mm tends to cause bending of the composite sheet when the vessel is inserted into the sleeve and the thickness of the label becomes irregular. In addition, the wrapping characteristics of the composite sheet decrease, for example, the composite sheet does not uniformly shrink as with non-foamed sheets or films when the sleeve is heated and leads to loss of product.

Too thin a thickness of the foamed sheet also leads to a decrease in thermal insulation, shock absorption performance and opacifying power. Low opacifying power results in such practical problems as the color tone of the printed picture on the composite sheet is affected by the content of the vessel when the vessel such as glass and plastic bottles is filled with a material having a dark color.

On the other hand, a thickness exceeding 0.30 mm makes allowance in heat-sealing conditions narrow on preparing the sleeve from the composite sheet. Consequently, loss increases and additionally efficiency is reduced in the increased temperature treatment such as retort sterilization, which circumstances are unfavorable for practical use.

The preferred density of the foamed polyolefin sheet is in the range of 0.1 to 0.8 $g/cm^3$. When the density is less than 0.1 $g/cm^3$, heat sealing is impaired in the case of using the sheet as a label and effect is simultaneously lowered in the increased temperature treatment such as retort sterilization. On the other hand, a sheet density exceeding 0.8 $g/cm^3$, results in uneven shrinkage of the sheet when the sleeve made by the sheet is heated, or leads to remarkable reduction in adhesion of the label to the vessel when the vessel with the label is cooled to temperature. These results deteriorate the effects of the foamed sheet.

The shrinking ability of the foamed polyolefin sheet is specified by the shrinkage obtained when heated at 150° C. Shrinkage is normally measured by immersing the specimen in an oil bath at 150° C. for a minute. Shrinkage is 20% or more, preferably from 25 to 70% in one direction and preferably less than 5% in the transverse direction. A shrinkage less than 20% leads to insufficient adhesion of the label to the vessel after shrinking when the composite sheet is used for the label. On the other hand, when the shrinkage exceeds 70%, uniform shrinkage cannot be obtained in the heat-shrinking step and deformation of the printed pattern can occur locally. Shrinkage in the periphery of the sealed parts can also occur in the heat-sealing step and much loss is generated on inserting the vessel into the sleeve.

The foamed polyolefin sheet having the above shrinking ability has preferably a larger shrinkage in the axial direction (the direction of extrusion flow). The foamed sheet is prepared by mixing polypropylene, polyethylene, foaming agent and, when necessary, other additives, followed by processing into a sheet having a density of 0.1 to 0.8 $g/cm^3$ through a conventional method, and by stretching the resultant sheet at an increased temperature lower than the melting point of the polypropylene.

On the other hand, the polyolefin-base film is a mono- or multi-layer film obtained by using polypropylene as a major raw material. In order to improve the heat-sealing property, shrinking ability and shock absorbing property, resins such as polyethylene, polybutene, ethylene-propylene rubber, and ethylene-butene rubber may be added in an amount of less than 30 parts by weight, preferably 5 to 20 parts by weight per 100 parts by weight of polypropylene.

These raw-materials are processed into the form of film by a conventional film extrusion method. The heat-shrinkage of the polyolefin-base film is less than 10% in both one direction and the transverse direction at 120° C. A shrinkage exceeding 10% leads to deformation of the label pattern when the composite sheet prepared from the film shrinks to fit on the vessel as the label and thereafter the vessel, for example, a glass bottle is subjected to increased temperature treatment such as retort sterilization.

When the shrinkage of the foamed sheet is compared at 120° C. with that of the film, the former is preferably larger than the latter.

When the shrinkage of the polyolefin-base film exceeds that of the foamed polyolefin sheet, the sleeve prepared from the composite sheet generates a large shrink crease on the label when the sleeve is wound on the vessel by heating. Thus, the appearance of the vessel is much impaired.

The thickness of polyolefin film is in the range of 0.01 to 0.05 mm. A thickness less than 0.01 mm leads to breakage of the film and loses the effect of laminating the polyolefin-base film when the vessel covered with the composite sheet is subjected to a retort sterilization step. On the other hand, when the thickness of the film exceeds 0.05 mm, wrinkles occur in the shrinking step of the resultant composite sheet or the label becomes loose after cooling the vessel to room temperature.

The polyolefin base film may be prepared by mixing polypropylene with other resins in consideration of heat-sealing property, shock absorbing property, blocking resistance and slippage in addition to shrinking ability.

The heat-seal strength of the polyolefin-base film is 500 g or more. The strength is measured with a specimen obtained by pressing at 140° C. for 2 seconds under pressure of 2 kg/cm² and expressed by a tensile strength per 15 mm width.

The heat-shrinkable polyolefin composite sheet of the invention is used as a label for a vessel. More particularly, the composite sheet is cut into a prescribed size, both ends of the cut sheet are heat-sealed to form a sleeve so that the circumferential direction has larger shrinkage, the sleeve thus obtained is fitted on a vessel followed by heating to firmly adhere the sleeve to the vessel, and then the vessel is used.

When heat-sealing of the polyolefin base film is carried out under conditions above 140° C., a large degree of shrinkage occurs in the vicinity of the heat-sealed portion of the sleeve and the vessel cannot be inserted into the resulting sleeve.

On account of the properties of the polyolefin-base resin, the film is liable to break by fusing when heat-sealing is conducted under the above conditions and hence loss increases in the sleeve forming step.

When heat-sealing is carried out at 140° C. and the heat-seal strength obtained is less than 500 g/15 mm, the polyolefin film laminated composite sheet often generates defects due to separation from the sealed surface in the step of heating the vessel fitted with the sleeve or in the step of increased temperature treatment such as retort sterilization. Thus, the effect of laminating the polyolefin film is lost.

The polyurethane-base adhesive which can be used in the present invention is prepared by reacting a conventional polyisocyanate having two or more isocyanate groups in a molecule with a polyether polyol or a polyester polyol having hydroxyl groups at the ends of polymer chain.

Exemplary isocyanates which can be used for the adhesive of the invention include hexamethylene diisocyanate, lysine diisocyanate, 4,4'-methylenebis(cyclohexyl isocyanate), methylcyclohexane-2,4-diisocyanate, methylcyclohexane-2,6-diisocyanate, 1,3-(isocyanatomethyl) cyclohexane, isophoronediisocyanate, trimethylhexamethylene diisocyanate, dimer acid diisocyanate, tolylene diisocyanate, 4,4'-diphenylmethane diisocyanate, xylylene diisocyanate, and m-xylylene diisocyanate.

The polyurethane-base adhesive is a usual dry lamination type adhesive which conducts curing by reacting the above polyisocyanate with a polyester, polyether or glycol containing terminal hydroxyl groups.

Common dry lamination equipment can be used for applying the polyurethane-base adhesive to the interface of the above heat-shrinkable formed polyolefin sheet and the polyolefin-base film. Curing of the polyurethane-base adhesive is usefully carried out at 50° C. or less.

The heat-shrinkable polyolefin composite sheet of the invention is prepared by laminating the above foamed polyolefin sheet and the polyolefin film with the polyurethane-base adhesive. In the composite sheet, characters and patterns are printed on the surface of the foamed polyolefin sheet or on the back surface of the polyolefin film. The back surface of the polyolefin film is preferred.

The above foamed sheet and film are adhered by the polyurethane-base adhesive so as to insert the characters and patterns between the foamed polyolefin sheet and the polyolefin film.

The embodiments of the present invention include, for example, a composite sheet obtained by printing characters and patterns on the surface of a foamed polyolefin sheet, applying a polyurethane-base adhesive thereon and laminating a polyolefin film on the applied adhesive, and a composite sheet obtained by applying a polyurethane-base adhesive on the surface of a foamed polyolefin sheet and laminating thereon a polyolefin film where characters and patterns are previously printed on the back surface.

Additionally in these embodiments, application of printing both on the back-side of the film and on the surface of the foamed sheet in order to exhibit specific design effects is permitted so long as these printed surfaces are adhered through the adhesive layers.

The thickness of the polyurethane-base adhesive layer which adheres the foamed sheet to the film is usually in the range of 0.1 to 5 μm.

The present invention will hereinafter be illustrated by way of typical examples.

EXAMPLE 1

A foamed polypropylene sheet having a thickness of 0.12 mm, a density of 0.6 g/cm³, and a shrinkage at 150° C. of 35% in the flow direction and 2% in the transverse direction was printed with a urethane base ink (Trade mark UNITAF ; a product of Dainippon Ink and Chemicals Co. Ltd.). A polypropylene film having a thickness of 0.025 mm, and a shrinkage at 120° C. of 1% in one direction and 0% in the other direction (Trade mark TAF-501C; a product of Tosero Co., Ltd.) was laminated with the above foamed sheet. Lamination was carried out with a polyurethane-base adhesive (Trade mark, EPS75A/KW40; a product of Dainippon Ink and Chemicals Co. Ltd.) by using a conventional dry lamination machine.

The laminated composite sheet had a shrinkage at 150° C. of 32% in the flow direction and 2% in the transverse direction. The composite sheet was fabricated with a machine for winding on an ellipsoidal glass bottle like a "sake" bottle. The composite sheet of continuous length was cut into a prescribed length, wound on a cylindrical die (mandrel) under vacuum suction and the edges thermowelded with a heat seal bar. The sleeve obtained was automatically fitted on the bottle (sleeve fabrication ability), and then passed through a shrink tunnel at 250° C. Processing is carried out at a rate of 200 bottles per minute. No problem was found on the covering properties of the sleeve on the bottle. The sleeve was firmly adhered to the bottle after shrinking treatment and neither separation nor breakage was found in the heat-sealed portion (shrinking ability).

These covered glass bottles were immersed in a hot water at 120° C. for 30 minutes. Almost no change was observed on the apearance after immersion (retort durability).

COMPARATIVE EXAMPLES 1 AND 2

A composite sheet was prepared by carrying out the same procedures as conducted in Example 1 except that thicknesses of the foamed sheet and the film were changed to 0.32 mm and 0.04 mm, respectively. The composite sheet was wound on glass bottles and subjected to the shrink test and the retort test. Results on various evaluations carried out by the same tests as conducted in Example 1 are illustrated in Table 1.

EXAMPLE 2

A composite sheet was prepared by carrying out the same procedures as conducted in Example 1 except that a foamed polypropylene sheet having a thickness of 0.20 mm, a density of 0.5 g/cm³, and a shrinkage at 150° C. of 25% in the flow direction and 1% in the transverse direction was used. The performance of the composite sheet was evaluated by the same procedures as conducted in Example 1. Results are illustrated in Table 1.

COMPARATIVE EXAMPLE 3

A composite sheet was prepared by carrying out the same procedures as conducted in Example 2 except that a polypropylene film having a thickness of 0.06 mm was used. The composite sheet thus obtained had a shrinkage of 18% in the flow direction. Results on the performance evaluation of the composite sheet are illustrated in Table 1.

COMPARATIVE EXAMPLE 4

A composite sheet was prepared by carrying out the same procedures as conducted in Example 2 except that a polypropylene film having a thickness of 0.025 mm and a shrinkage at 120° C. of 6% was used. Results on the performance evaluation of the composite sheet are illustrated in Table 1.

EXAMPLE 3

A commercial film which had a thickness of 0.025 mm and was substantially prepared from a propylene-ethylene random copolymer (Trade mark, P1128AE; a product of Toyobo Co. Ltd.) was used as a polyolefin film. The film had a shrinkage of 5% in the machine direction (MD) and 2% in the transverse direction (TD), respectively.

The foamed polyolefin sheet was prepared by the following process.

A mixture composed of 100 parts by weight of polypropylene, 20 parts by weight of low density polyethylene, and 0.5 part by weight of azodicarboxylic acid amide per 100 parts by weight of the sum of polypropylene and low density polyethylene was melt-kneaded in an extruder having a diameter of 25 mm. The kneaded mass was extruded through a T-die and stretched six times in the winding direction while making contact with rolls at 120° C. to obtain a foamed sheet having a thickness of 0.12 mm and a density of 0.6 g/cm³. Then the foamed sheet thus obtained was annealed by contact with hot rolls at a prescribed temperature to obtain a heat-shrinkable foamed sheet illustrated in Table 2.

After printing the above foamed sheet, the foamed sheet and the above commercial film were laminated with a polyurethane base adhesive (Trade Mark, Olester NP-1100 1 NL-2448; a product of Mitsui Toatsu Chemicals Inc.) by using a conventional dry-laminating machine.

Practical quality of the composite sheet thus obtained was evaluated by the following methods and results are illustrated in Table 2.

(1) Sleeve fabrication ability and fitting ability on the vessel.

The composite sheet was cut into a prescribed size, wound on a mandrel and heat-sealed to form a sleeve. Then the sleeve was taken out of the mandrel and simultaneously fitted on a vessel from the bottom of the vessel.

(2) Shrinkability

The sleeve covered bottle was passed at a prescribed rate through a shrink tunnel maintained at an atmospheric temperature of about 200° C. Thereafter adhesion of the composite sheet to the bottle and appearance of the composite sheet were examined.

(3) Retort durability

Foods were filled into the vessel covered with the composite sheet was allowed to stand in a retort at 120° C. for 30 minutes. After removal from the retort, appearance of the composite sheet was checked.

Comparative Example 5

The same procedures as conducted in Example 3 were carried out except that annealing conditions were changed. A composite sheet thus obtained was evaluated with respect to its properties.

A sleeve was prepared from the composite sheet, fitted on a vessel and shrunk. Wrinkles occurred on the outside surface of the composite sheet and the foamed sheet was curled to the outside at the top and bottom edges.

Comparative Example 6

A composite sheet was prepared by carrying out the same procedures as conducted in Example 3 except that a commercial polypropylene film (Trade mark, P1120; a product of Toyobo Co. Ltd.) was used. Results on the evaluation of the composite sheet thus obtained are illustrated in Table 2.

TABLE 1

|  | Example 1 | Comparative Example 1 | Comparative Example 2 |
|---|---|---|---|
| Foamed sheet |  |  |  |
| Thickness (mm) | 0.12 | 0.04 | 0.32 |
| Density (g/cm³) | 0.6 | 0.6 | 0.5 |
| Shrinkage (%)* | 35/2 | 48/5 | 25/3 |
| Film |  |  |  |
| Thickness (mm) | 0.025 | 0.025 | 0.025 |
| Shrinkage (%)* | 1/0 | 1/0 | 1/0 |
| Composite sheet Shrinkage (%)* | 32/2 | 46/0 | 23/3 |
| Sleeve fabrication (winding) | Good | Many rejections in bottle insert | Good |
| Shrinkability | Good | — | Separation a heat-sealed portion |
| Retort endurance | No change on appearance (Good) | — | — |

|  | Example 2 | Comparative Example 3 | Comparative Example 4 |
|---|---|---|---|
| Formed sheet |  |  |  |
| Thickness (mm) | 0.20 | 0.20 | 0.20 |
| Density (g/cm³) | 0.5 | 0.5 | 0.5 |
| Shrinkage (%)* | 25/1 | 25/2 | 25/1 |
| Film |  |  |  |
| Thickness (mm) | 0.025 | 0.06 | 0.025 |
| Shrinkage (%)* | 1/0 | 1/0 | 6/6 |
| Composite sheet Shrinkage (%)* | 27/2 | 18/1 | 28/6 |
| Sleeve fabrication (winding) | Good | Good | Good |
| Shrinkability | Good | Poor adhesion to bottle | Good |
| Retort endurance | No change on appearance | — | 3% pattern shrinkage in |

TABLE 1-continued

|  |  |
|---|---|
| (Good) | height |

*Note: Shrinkage is indicated by flow direction/transverse direction.

TABLE 2

|  | Example 3 | Comparative Example 5 | Comparative Example 6 |
|---|---|---|---|
| Foamed sheet |  |  |  |
| Thickness (mm) | 0.12 | 0.12 | 0.12 |
| Density (g/cm³) | 0.6 | 0.6 | 0.6 |
| Shrinkage (%) |  |  |  |
| 120° C. (MD/TD) | 15/1 | 4/0 | 15/1 |
| 150° C. (MD/TD) | 35/2 | 23/1 | 35/2 |
| Film |  |  |  |
| Thickness (mm) | 0.025 | 0.06 | 0.025 |
| Shrinkage (%) 120° C. (MD/TD) | 5/2 | 5/2 | 1/0 |
| Heat-seal strength (g/15 mm) | 1000< | 1000< | 400 |
| Composite sheet Shrinkage (%) 150° C. (MD/TD) | 34/2 | 22/1 | 32/2 |
| Sleeve fabrication (winding) | Good | Good | Sleeve juncture line tends to separate on fitting |
| Shrink ability | Good | Wrinkles on outside surface or outside curling at top and bottom edges | Separation at heat-sealed portion |
| Retort endurance | No change in appearance (Good) |  |  |

What is claimed is:

1. A heat-shrinkable polyolefin composite sheet comprising a laminate of:
   (a) a heat shrinkable foamed polyolefin sheet having a thickness of from 0.05 to 0.30 mm, a density of from 0.1 to 0.8 g/cm³, and a shrinkage at 150° C. of 20% or more in one direction and less than 5% in the transverse direction, and:
   (b) a polyolefin-base film having a thickness of from 0.01 to 0.05 mm and a shrinkage in both one direction and the transverse direction at 120° C. of less than 10%, said heat shrinkable foamed polyolefin sheet and said polyolefin-base film being laminated through a polyurethane-base adhesive.

2. A heat-shrinkable polyolefin composite sheet of claim 1 wherein the shrinkage at 120° C. of the heat-shrinkable foamed polyolefin sheet is larger than the shrinkage at 120° C. of the polyolefin-base film.

3. A heat-shrinkable polyolefin composite sheet of claim 1 wherein the heat-seal strength between the heat-shrinkable foamed polyolefin sheet and the polyolefin-base film is 500 g/15 mm or more at 140° C.

4. A heat-shrinkable polyolefin composite sheet of claim 1 wherein printing is provided on the interface in laminating the heat-shrinkable foamed polyolefin sheet and the polyolefin-base film.

* * * * *